July 7, 1953  G. SMOLAK ET AL  2,644,781
LIGHTWEIGHT PANEL AND METHOD OF MANUFACTURE
Filed Feb. 25, 1950
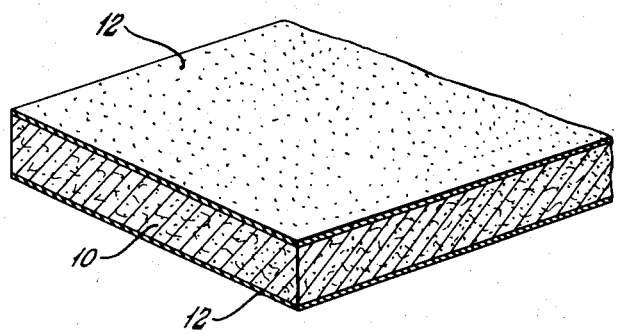
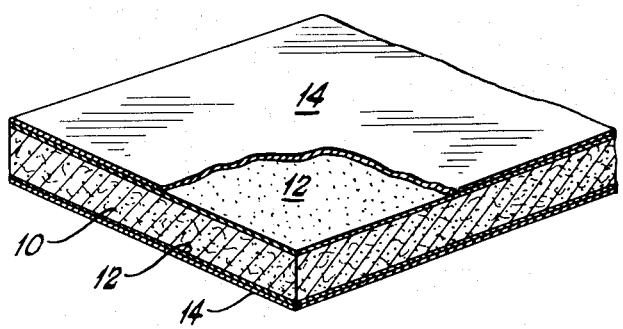
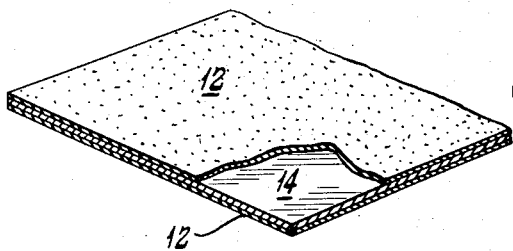
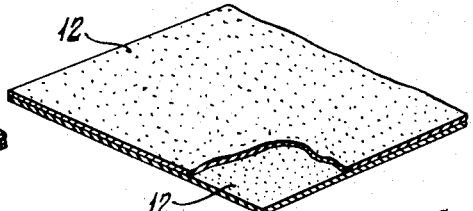
INVENTORS
GEORGE SMOLAK.
EDWIN F. DYER.
BY Virgil C. Kline
ATTORNEY Patented July 7, 1953

2,644,781

UNITED STATES PATENT OFFICE 2,644,781

LIGHTWEIGHT PANEL AND METHOD OF MANUFACTURE

George Smolak and Edwin F. Dyer, Somerville, N. J., assignors to Johns-Manville Corporation, New York, N. Y., a corporation of New York Application February 25, 1950, Serial No. 146,214

10 Claims. (Cl. 154—128)

The present invention relates to inorganic sheet products, and is particularly directed to strong, fireproof, light weight sheet laminates, and a method for making the same.

An object of the invention is to provide strong inorganic sheet laminates which retain structural stability after long flame exposure at temperatures at least as high as 1500° F.

Another object is to impart flexural strength and smooth, hard surfaces to sheets of felted asbestos.

A further object is to provide an inorganic sheet laminate having heat and moisture stability as well as flexural strength and resistance to indentation and delamination.

A particular object is to provide a fireproof, heat and moisture stable laminate of light weight having hard, smooth surfaces and adequate strength to adapt it for use as a frame-supported wall panel.

A specific object is to provide a strong in situ developed interlocking inorganic bond at the interface between a cellular inorganic sheet or board core and thin, dense and strong inorganic reinforcing sheets applied as veneer facings.

A further object is to provide an improved method of manufacturing strong, fireproof, light weight boards and panels.

A still further object is to provide a strongly bonded inorganic laminate of good heat insulating properties having smooth, hard surfaces and having sufficient flexural and compressive strength as to adapt it for wall construction with a minimum of supporting structure.

With these objects in view, the invention consists in the improved laminates and method of manufacture which are hereinafter described and more particularly defined in the accompanying claims.

Preferred embodiments of the invention are illustrated in the accompanying drawings, and the invention will be hereinafter described by reference thereto.

Fig. 1 presents a fragmentary perspective view of a three ply laminate structural panel including a thick, light weight core and relatively thin, smooth and dense reinforcing veneer facings;

Fig. 2 is another fragmentary perspective view of a five ply laminate structural panel having a light weight core and having outer veneer facings of sheet metal;

Fig. 3 is a fragmentary perspective view of a sheet laminate having a thin core ply as well as thin facing plies; and Fig. 4 is a fragmentary perspective view of a two ply sheet laminate.

According to the present invention, the known chemical reactivity of phosphoric acid with certain inorganic materials including clays, metals, metal oxides and chrysotile asbestos fibers, at elevated temperature, is utilized for developing strong, light weight sheet laminates, some of which are adapted as heat insulating fireproof structural panels and boards. The present laminates have great strength and moisture and heat stability and can withstand direct flame exposure without decomposition of the binder or release of toxic gases.

Development of such laminate bonds of optimum strength and stability is dependent on use of aqueous orthophosphoric acid of definite concentration limits. It has been found that a particularly effective bonding medium is afforded by impregnating sheets of chrysotile asbestos paper or millboard with orthophosphoric acid of 40–50% concentration. When the concentration of the impregnating acid is substantially less than 40% or greater than 50%, the resulting felted asbestos sheet laminate exhibits substantially less structural integrity and strength and greater tendency toward embrittlement and delamination. Orthophosphoric acid of approximately 45% concentration provides the optimum proportions of water and anhydrous phosphoric acid for developing interlaced hydrous mineral phosphate crystals affording strongly adhesive heat stable bonds at the laminate interfaces during hot pressing.

That embodiment of the invention which is portrayed in Fig. 1 is a unitary three ply laminate board or panel characterized by great strength and rigidity for its weight. This laminate comprises a relatively thick low density core 10 preferably consisting of asbestos reinforced hydrous calcium silicate, and smooth, hard veneer facings 12 preferably comprising sheets of phosphate binder reinforced felted asbestos paper which are thin relative to the thickness of the core. Thus reinforced asbestos paper having an average initial thickness of say .023 inch provides, after hot press heat cure, a thin veneer reinforcing sheet having a hard, smooth surface and imparting to the laminate greatly increased flexural strength and resistance to indentation.

A three ply structural panel of greater strength may embody a core sheet 10 of about ⅝ inch thickness comprising asbestos fiber reinforced hydrous calcium silicate of 10–40 lbs./cu. ft. density, united by in situ developed interface phosphate bonds to veneer facing sheets of approximately .090 inch thickness comprising strong, hard and dense asbestos-Portland cement composition. Such panels are particularly suited as moisture stable and fireproof wall panels for ship construction. The strong interlaced phosphate crystal bond provides strong adhesion of the veneer to the core, and the veneer faces impart to the resulting laminate sheet a modulus of rupture above 4000 lbs./sq. in., and a dent resistance or hardness above 19.0 on the Brinell hardness scale.

Multi-ply panels of light weight adapted for marine construction, are produced by plying veneer sheets of orthophosphoric acid impregnated asbestos paper or asbestos millboard to core sheets of either asbestos reinforced lime-silicate or other hydraulic cement composition, or to metal sheets such as aluminum or steel, by hot pressing. Phosphoric acid impregnated asbestos paper develops on hot pressing a smooth, non-pitted surface which is very attractive and which forms an excellent base for application of paint. The paper may also be modified to incorporate pigments. The phosphoric acid treated asbestos paper or millboard veneers have the advantage over other veneers herein mentioned of maintaining the weight of the final laminate product at a minimum. This weight advantage is very important in marine construction.

When greater strength and resistance to denting or impact is desired over laminates having single ply paper veneers, two or three ply asbestos paper, or asbestos millboard, may be substituted for the single ply asbestos paper. The surface of the millboard may be pigmented to make it as attractive as veneers of phosphoric acid treated asbestos paper. The phosphoric acid treated millboard has substantially the same advantage with respect to low density and appearance as does the veneer of asbestos paper. Like the paper, the millboard requires no sanding or finishing treatment after hot pressing of the phosphoric acid impregnated millboard veneered sheet.

It is frequently desirable to provide a structural panel having a veneer facing of sheet metal such as steel, aluminum or zinc. It has been found impracticable to ply the sheet metal sheets directly to a low density core by means of in situ formed phosphate bonds, for the reason that the resulting product is subject to delamination because of the stresses set up by differential thermal expansion of the metal and of the core. The five ply product shown in Fig. 2 illustrates how this difficulty has been overcome by interposing orthophosphoric acid impregnated sheets of asbestos paper between the low density core and the metal veneer, prior to hot press consolidation. The orthophosphoric acid treated asbestos paper retains, after hot press cure, sufficient inherent resiliency to absorb without rupture any stresses resulting from expansion of the metal veneer during hot pressing or during subsequent service.

While the laminates illustrated embody a core ply having facing veneer plies bonded to both major faces thereof, the invention contemplates (Figs. 3 and 4) laminates of two or more plies of like or unlike composition, as for example plied orthophosphoric acid impregnated asbestos paper, or plied sheets of such paper and metal sheets. Laminates embodying sheet metal can be used as structural elements and also as radiant heater plates, vapor barriers and liquid container walls.

The laminate boards or panels which are illustrated in Figs. 1 and 2 preferably embody a flat relatively thick core sheet 10 of inorganic composition comprising a hydrated, hardened product of a molding mixture containing 10% to 60% asbestos fibers, chiefly amosite or harsh chrysotile fibers, and approximately equal proportions of slaked lime and finely divided diatomaceous silica. A core sheet 10 of the indicated composition is produced by pressure filter molding an aqueous slurry suspension of the asbestos fibers, slaked lime and diatomaceous silica, and thereafter developing a hardening hydration cure by autoclaving for several hours in a pressure steam atmosphere at steam pressures ranging from 60–100 lbs./sq. in. The core 10 may range in thickness between say ½ inch and 3 inches, and preferably has a density in the range 15–45 lbs./cu. ft. In the laminate illustrated in Fig. 2, the core 10 is sheathed by comparatively thin sheet metal veneer facings 14. Interposed between the core 10 and metal facings 14 are bonding sheets 12 which comprise chrysotile asbestos paper normally embodying about 20% by weight of inorganic binder such as hydrated lime silicate, and which is further strengthened and reinforced by in situ developed hydrous phosphate bonds formed by reaction between the chrysotile asbestos fibers and inorganic binder and aqueous orthophosphoric acid. The asbestos paper sheets 12 are produced on a conventional paper machine under conditions of curing temperature and pressure adequate to develop hydration hardening reaction of any lime-silicate binding ingredients present.

Multi-ply sheet laminates such as portrayed in Figs. 3 and 4 may comprise two plies of conventional asbestos paper containing as a major constituent chrysotile asbestos fibers, together with reacted bonding ingredients including hydrated phosphates formed in situ by heat and pressure reaction of orthophosphoric acid with the chrysotile asbestos fibers. The core ply of a three ply laminate may comprise thin sheet metal, i. e., sheet steel, aluminum or zinc. The invention further contemplates products of this type in which the core ply consists of heat and pressure consolidated orthophosphoric acid impregnated asbestos paper, and the facing plies comprise sheet metal such as sheet steel or aluminum.

To apply dense sheets of asbestos-cement composition as facing veneers for laminates such as portrayed in Fig. 1, the low density core is thoroughly coated and wetted with orthophosphoric acid of 50%–60% concentration, and the laminates are then bonded by hot press plying at press temperatures approximating 300° F. and at pressures ranging from 400–800 lbs./sq. in.

An alternative method of developing a good bond between a strong dense veneer sheet of asbestos-cement and a low density core sheet, is by interposing a bonding ply of orthophosphoric acid impregnated asbestos paper between the core and veneer plies, as previously described with reference to the metal sheet veneers.

An initial step in the manufacture of laminate products embodying felted asbestos sheets consists in impregnating the asbestos paper or millboard sheets 12 with an aqueous solution of orthophosphoric acid. Best results are obtained by immersing the asbestos sheets in a bath of the orthophosphoric acid solution for a few seconds, employing in the bath an acid concentration of between 40% and 50% orthophosphoric acid. After thus saturating the asbestos sheet, the saturated sheet is drawn through the bite between a pair of rubber squeeze rolls to remove excess acid. One or more thus saturated asbestos sheets are then plied with one or more thick core sheets 10 or metal sheets 14. Stacked layers of the thus formed wet laminate units are assembled on press platens and are subjected to curing heat and pressure within a platen press for a period of time sufficient to develop a strong phosphate bond within the body of each of the felted asbestos sheets and at the interface between the felted asbestos sheet and the other core or metal sheet plied therewith.

The amount of orthophosphoric acid introduced to asbestos paper or millboard sheets is controlled by varying the concentration of the acid in the paper saturating vat. Optimum results were obtained with veneer sheets of asbestos paper or millboard by using orthophosphoric acid of 40–50% concentration for saturating the paper. The paper used was a commercial paper averaging .023 inch thickness and weighing 10 lbs. per hundred square feet. The composition of this paper was approximately 80% chrysotile asbestos fibers and about 10% each of sodium silicate and hydrated lime which react to form hydrous calcium silicate. Using an orthophosphoric acid of 45% concentration in the saturating bath, the paper is impregnated with about 10 grams of $P_2O_5$ or 30 grams of such dilute acid per square foot, which represents about 66% by weight of 45% acid or 22% by weight of $P_2O_5$ based on the dry weight of the paper.

Any substantial increase or decrease of the concentration of acid impregnant with respect to that indicated above as optimum, has the effect of lowering both the transverse strength of the panel and its resistance to indentation. For example a three ply laminate such as shown in Fig. 1 having a core of 30 lbs./cu. ft. density and veneer plies of asbestos paper developed a modulus of rupture of 1100 lbs./sq. in. after hot press cure when the paper plies were initially impregnated with orthophosphoric acid of 45% concentration. A similar three ply sheet of the same composition after an identical hot press cure exhibited a modulus of rupture of approximately 900 lbs./sq. in. when the paper plies used were impregnated with acid of 30% concentration. Likewise a three ply laminate of the same composition was given the same hot press cure cycle after impregnating the paper plies with orthophosphoric acid of 60% concentration, and the modulus of rupture tested at less than 850 lbs./sq. in. Any substantial increase in the orthophosphoric acid concentration above 50% increases the brittleness of the surface of the veneer facing of the finished product, and weakens the flexural strength of the panel. Panels pressed with paper veneer impregnated with orthophosphoric acid of 75% concentration develop an objectionable tendency to delaminate. Operating difficulties were also encountered when saturating the paper with acid of 30% concentration, one such difficulty being that such papers tended to adhere to the press platens.

Since a primary object of the invention is to provide a laminate of high strength and low density, it is important to limit the pressure developed during the hot press cure to avoid any excessive increase of density of the light weight core. It has been found that laminate panels of very desirable properties can be produced when limiting the press pressure to an amount which yields a laminate having approximately the thickness of the original core sheet. For example, a press pressure of 500 lbs./sq. in. applied over a ten to fifteen minute press cycle was found to produce a half inch thick laminate sheet, using as a core a half inch thick sheet of asbestos reinforced hydrated calcium silicate, and using as veneer facing sheets two saturated asbestos paper sheets each having a thickness of about .023 inch. Part of the resulting compression takes place within the core, and the balance of the compression serves to densify the paper veneer sheets to eliminate screen impressions and to develop hard, glossy, smooth surfaces.

Best results were obtained when the wet saturated laminates were introduced to the curing press at a temperature not substantially exceeding room temperature. If the wet laminates are molded on excessively hot press platens, there is a tendency for the acid to react with the paper prior to developing the necessary pressure to insure a strong bond between the paper and the lightweight core. It is desirable to employ a press with hollow platens which can be rapidly heated or cooled as by circulation of steam or water therein, to thereby reduce the length of the press cycle. With properly heated and cooled press platens it is possible to limit the press cycle to ten minutes or less while developing temperatures within the press as high as 300–400° F. during the press cycle. When operating a press with platens at substantially room temperature at the beginning of the cycle, and platens removed from the press at temperatures not substantially exceeding 150° F. at the end of the cycle, it is possible with adequately heated and cooled platens to limit the press cycle to a time of fifteen to twenty minutes, when heating the platens with steam under 60–100 lbs./sq. in. during the press cycle. The press cycle heating time can be reduced by heating with steam at 120–160 lbs./sq. in. Optimum press pressure for producing laminates from cores of about 30 lbs./cu. ft. density approximates 500 lbs./sq. in.

Since most of the moisture present in the laminate sheets at the beginning of the press cycle consists of the moisture present in the orthophosphoric acid with which the veneer or binder sheets are saturated, it has been found that no drying is necessary after the completion of the press cycle. Part of the moisture is retained as combined moisture in the hydrous orthophosphates which comprise the bonds developed during the hot press curing cycle. The balance of the moisture retained in the product does not substantially exceed the normal moisture content of the laminate product.

Representative strength test determinations have demonstrated that it is possible to produce laminate wall panels having transverse strengths averaging 75% greater than the transverse strengths of the light weight cores of about 30 lbs./cu. ft. density employed in their manufacture, by using single veneer facing and backing plies of orthophosphoric acid saturated asbestos paper which increase the weight of the product by an average of only 17%. The saturated asbestos paper veneers provide attractive, smooth, glossy, non-pitted surfaces which can be finished by conventional painting using a primer sealer and gloss finish paint coats.

By employing colored asbestos papers as the veneer sheets, decorative veneers can be readily produced which require no finish paint coatings. Even when employing non-pigmented papers, it is possible to apply a pigment veneer coat to the veneer finish by coating the surfaces of the veneer sheets with inert stable pigments of dispersed colloidal silicates. These pigment coatings can be set or cured in the same operation in which the veneer is cured by the hot press cycle. In this way pigmented asbestos paper veneers which are very attractive can be produced at low cost, yielding a product which is entirely inorganic.

Tests of the light weight veneer product show that it is completely flameproof and resistant to high temperatures. Exposure of the finished veneered panel to the direct flame of a gas burner has no decomposing effect on the phosphate bonded paper and does not, therefore, generate any poisonous or objectionable fumes.

Since orthophosphoric acid in the concentrations employed for saturating the felted asbestos sheets is highly reactive at moderately elevated temperatures, care has been taken to provide a suitable acid resistant coating for the metal press platens which will stand up against attack by the acid. Stainless steel or alloy metal platens have been proven unsatisfactory, as have also porcelain coated platens. The most satisfactory platens for the present purpose are those which have been provided with thin coatings of a heat set phenolic resin.

The following tests illustrate various improvements in laminates imparted by the present invention. A five ply laminate incorporating a ⅝ inch thick core sheet of about 30 lbs. density having a modulus of rupture of about 700 lbs. p. s. i., was reinforced with facing and backing veneers comprising 45% orthophosphoric acid impregnated two ply asbestos paper. After hot pressing the product had a thickness of approximately ⅝ inch, a modulus of rupture averaging about 1600 p. s. i., and a Brinell hardness of about 2.80 (under a 60 kg. load applied for ten seconds by a 10 mm. ball). This five ply panel retained good structural integrity as defined by the ASTM fire test, during which the temperature of the flame exposed face rose to approximately 1560° F. in thirty minutes, while the temperature of the opposite face rose approximately 250° F. above room temperature in fifteen minutes. The weight of this product was approximately 2.1 lbs./sq. ft.

A three ply laminate having facing and backing veneers of single ply asbestos millboard of approximately .075 inch thickness impregnated with 45% orthophosphoric acid and a core of 1 inch thickness and 30 lbs./cu. ft. density, developed during hot press cure a modulus of rupture of 3250 p. s. i., and a Brinell hardness of approximately 3.72. The strength increase imparted by the millboard veneer amounted to approximately 400%, with a weight increase of less than 50%.

It will be understood that the details given are for the purpose of illustration, not restriction, and that variations within the spirit of the invention are intended to be included in the scope of the appended claims.

What we claim is:

1. The method of manufacturing sheet laminates which comprises, impregnating a thin dense sheet containing chrysotile asbestos fibers with aqueous orthophosphoric acid of 40–60% concentration, forming an inorganic sheet laminate incorporating such impregnated sheet and another sheet containing a phosphate forming mineral, and hardening and bonding the laminate under heat and pressure.

2. The method of making strong inorganic sheet laminates which comprises, saturating a sheet comprising felted asbestos fibers and small amounts of sodium silicate and lime with about 66% of its dry weight of aqueous orthophosphoric acid of 40–50% concentration, forming a laminate of the thus saturated sheet with another inorganic sheet containing a phosphate forming mineral, and developing a strong hydrous metal phosphate bond within the saturated sheet and at the interface of the plied sheets by press consolidating and heat curing the laminate assembly.

3. The method of making a strong inorganic laminate which comprises, saturating two suitably dimensioned sheets of asbestos paper with orthophosphoric acid of 40–50% concentration, forming a laminate of the thus saturated sheets with another sheet containing phosphate forming minerals, and developing a strong hydrous metal phosphate bond at the ply interfaces and extending into each plied sheet by press consolidating and curing the laminate assembly at an elevated temperature.

4. The method of manufacturing inorganic sheet laminates which comprises, thoroughly wetting a face of a low density sheet of asbestos fiber reinforced hydrated and hardened calcium silicate with aqueous orthophosphoric acid of 50–60% concentration, applying to the thus wetted sheet a veneer facing sheet of dense and hard asbestos-cement composition, and consolidating and bonding the laminate thus formed under heat and pressure.

5. The method of making a strong, light weight sheet panel which comprises saturating a waterlaid asbestos fiber sheet with orthophosphoric acid of 40–50% concentration, applying said saturated sheet as a veneer to a thick core sheet of asbestos fiber reinforced hydrated and hardened calcium silicate, and developing strong hydrated calcium and magnesium phosphate bonds within the veneer and extending to some depth into the core by hot press curing the laminate assembly under several hundred pounds per square inch pressure.

6. In forming inorganic sheet laminates the steps comprising impregnating a sheet of felted chrysotile asbestos with aqueous orthophosphoric acid of approximately 40–50% concentration, forming a laminate of the impregnated sheet with a thin metal sheet, and press curing the laminate thus formed under heat and pressure.

7. The method of manufacturing laminated inorganic structural panels which comprises impregnating a felted asbestos sheet with aqueous orthophosphoric acid of 40–50% concentration, interposing said impregnated sheet between a core sheet containing a phosphate forming mineral and a strong and thin sheet metal veneer, and developing a strong hydrous metal phosphate bond at the ply interfaces by press consolidating and curing the laminate assembly at an elevated temperature.

8. The method of manufacturing laminated inorganic structural panels which comprises impregnating a felted asbestos sheet with aqueous orthophosphoric acid of 40–50% concentration, interposing said impregnated sheet between a relatively thick insulating core sheet of asbestos fiber reinforced hydrous calcium silicate and a strong and thin sheet metal veneer, and developing a strong hydrous metal phosphate bond at the ply interfaces by press consolidating and curing the laminate assembly at an elevated temperature.

9. The method of manufacturing sheet laminates which comprises impregnating a sheet containing staple asbestos fibers with aqueous orthophosphoric acid of 40–60% concentration, forming a laminate of said sheet with another ply containing a phosphate forming element, and hardening and bonding the laminate thus formed under heat and pressure.

10. The method of manufacturing laminated inorganic structural panels which comprises impregnating a sheet containing staple asbestos fibers with aqueous orthophosphoric acid of 40–60% concentration, interposing said impregnated sheet between a core panel containing a phosphate forming mineral and a metal ply, and developing a strong hydrous phosphate bond at the ply interfaces by pressure consolidating and curing the laminated assembly at an elevated temperature.

GEORGE SMOLAK.
EDWIN F. DYER.

References Cited in the file of this patent
UNITED STATES PATENTS

| Number | Name | Date |
|---|---|---|
| 2,047,016 | Elias | July 7, 1936 |
| 2,334,694 | Batcheller | Nov. 23, 1943 |
| 2,439,667 | Mathes | Apr. 13, 1948 |